Dec. 20, 1960 P. E. ROGGI ET AL 2,964,799
METHOD OF MAKING PLASTIC FOAM LAMINATES
Filed June 6, 1957 2 Sheets-Sheet 1
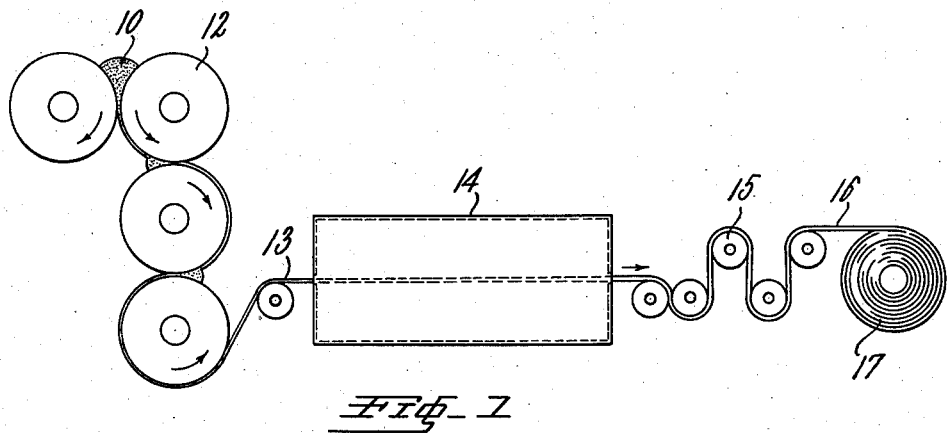
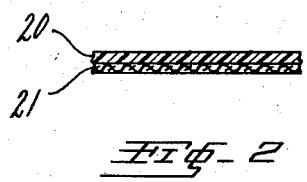
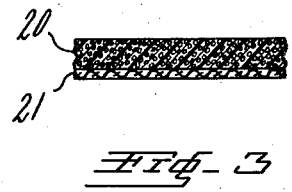
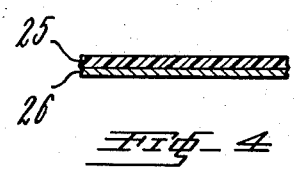
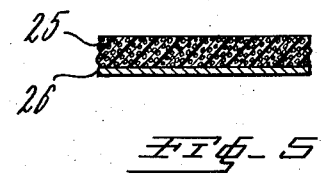
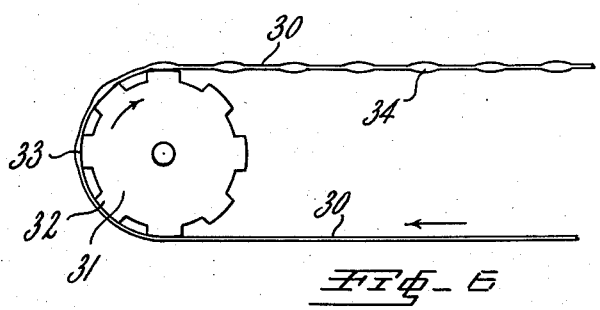
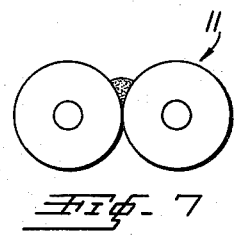
INVENTORS
PORFIRIO E. ROGGI
RAYMOND A. CHARTIER
BY James J. Long
AGENT MILL SOLID THERMOPLASTIC RESIN HAVING FUSION TEMPERATURE OF 150°-185°C. WITH BLOWING AGENT HAVING DECOMPOSITION TEMPERATURE OF AT LEAST 190°C. TO FORM SOLID NON-FLOWABLE SELF-SUPPORTING MASS

↓

CALENDER RESULTING MASS AT A TEMPERATURE WITHIN THE RANGE OF 150°-185°C. TO FUSE THE RESIN AND FORM A THIN FILM 0.001 TO 0.15 INCH THICK ON FABRIC

↓

PASS FILM-FABRIC THROUGH AN OVEN AT ATMOSPHERIC PRESSURE WITHOUT CONFINEMENT TO HEAT FILM TO A TEMPERATURE OF 190°-255°C., SAID FILM TEMPERATURE BEING MAINTAINED FOR 5 TO 60 SECONDS WHEREBY FILM EXPANDS FREELY WITHOUT DISRUPTION TO FORM BLOWN SHEET HAVING CONTINUOUS SURFACE LAMINATED TO FABRIC

↓

COOL BLOWN LAMINATE AND WIND IT INTO A ROLL

Fig. 8

INVENTORS
PORFIRIO E. ROGGI
RAYMOND A. CHARTIER
BY *James J. Long*
AGENT

United States Patent Office 2,964,799
Patented Dec. 20, 1960

2,964,799

METHOD OF MAKING PLASTIC FOAM LAMINATES

Porfirio E. Roggi, New Haven, and Raymond A. Chartier, Naugatuck, Conn., assignors to United States Rubber Company, New York, N.Y., a corporation of New Jersey Filed June 6, 1957, Ser. No. 664,062

5 Claims. (Cl. 18—59)

This invention relates to a method of making plastic foam laminates and more particularly it relates to a method involving calendering a thin film of thermoplastic material containing a chemical blowing agent onto a backing sheet, and subsequently blowing or expanding the film under such conditions that the film is not ruptured but retains the foamed structure thus imparted.

Plastic foams, specifically those based on vinyl chloride resins, are conventionally made by two major techniques, both of which utilize the vinyl resin in the form of a plastisol (i.e., a fluid dispersion of particulate vinyl resin in a plasticizer, capable of being converted into a solid gel by application of heat). In one technique, a chemical blowing agent (i.e., a chemical capable of generating a gas upon heating to decomposition temperatures) is incorporated in the plastisol at room temperature, and the resulting fluid mixture is poured into a mold, and is blown or expanded into its final shape by the application of heat (with or without pressure), such heat serving both to decompose the blowing agent and to gel and fuse the fluid plastisol into a solid, form-sustaining mass. The other general category of vinyl resin foaming method is illustrated by the so-called Elastomer and Fay Foamer processes (U.S. Patents 2,666,036, Schwencke, January 12, 1954; 2,763,475, Dennis, September 18, 1956), in which an inert gas is blown into a fluid plastisol mix and the mix is then metered out onto a continuous belt prior to fusing.

In both of the foregoing processes the only existing commercial way, insofar as the present inventors are advised, of making a continuous vinyl foam involves casting a fluid plastisol in the form of a slab or blanket, that is several inches thick after expansion, after which the slab may be split to various desired thicknesses. This process suffers from a serious limitation in that thin slabs cannot be economically cast directly, but can only be made by splitting thicker slabs. This is not only inconvenient, but the split pieces do not have a continuous skin on the surface and their utility is thereby limited because of reduced abrasion resistance and reduced adhesion surface, and because the surface is difficult, if not impossible, to clean. Such a surface also has an undesirable tendency to absorb moisture.

Accordingly, a principal object of the present invention is to provide an improved method of making thermoplastic resin foam laminates in the form of a thin sheet.

Another object is the provision of a method adapted to the continuous production of foam laminates from resins such as vinyl resin.

Still a further object is to provide a more economical and efficient process for making vinyl resin foam, that lends itself to variations, such as the production of composite articles made up in part of vinyl resin foam.

The manner in which the invention realizes the foregoing objects, as well as additional objects and advantages, will be made manifest in the following detailed description, which is intended to be read with reference to the accompanying drawings, wherein:

Fig. 1, represents in purely diagrammatic form one arrangement of apparatus for carrying out the invention;

Fig. 2 is a fragmentary cross-sectional view of a modification of the invention, showing a vinyl film calendered on to a fabric base;

Fig. 3 is a similar view of the coated fabric of Fig. 2, after blowing of the vinyl film;

Figs. 4 and 5 are similar to Figs. 2 and 3, respectively, but show the vinyl film applied to a metal base;

Fig. 6 is a purely diagrammatic representation of a modification of the invention in which the plastic film is heated at spaced intervals to form an intermittently blown product;

Fig. 7 is a diagrammatic cross-sectional view of an open roll mill in process of milling a solid plastic material at elevated temperatures in accordance with an initial step of the method of the invention; and, Fig. 8 is a flow diagram representing the practice of the invention.

In accordance with the invention, a thermoplastic resin composition which is solid in form at ordinary temperatures (as distinguished from a plastisol, which is essentially a fluid or paste at ordinary temperatures) having a fusion point less than 185° C., is first milled (either in an internal mixer or on an open roll mill, or both) with azodicarbonamide, suitably in amount of from about 0.5 to about 50 parts of azodicarbonamide per 100 parts of the resin, to make a uniform mixture in which the azodicarbonamide is dispersed or dissolved in the resin in an undecomposed state. Generally, the thinner the film the lower the concentration of the blowing agent, within the specified range. The temperature employed during such milling is less than would be required to decompose the azodicarbonamide. The solid, milled mass thus obtained is quite distinct from a plastisol. In a plastisol, the resin exists largely in particulate form, dispersed in a fluid medium (the plasticizer), the resin being at the initial stage ungelled and unfused, and the composition is flowable and non-self-supporting. In contrast, in the mill mix employed in the present invention, the resin is a unitary, solid mass, rather than particulate, and the composition is non-flowable and self-supporting at ordinary temperatures.

The milled mass is thereafter calendered into the form of a film or sheet, having a thickness of from 0.001 to 0.15 inch, under such conditions that the resin becomes fused into a continuous, strong film or sheet. The temperature employed in such calendering operation is in any case less than 185° C., and there is thus obtained a plastic sheet or film containing the incorporated azodicarbonamide in an undecomposed condition. This fused sheet, after cooling, is firm and non-tacky and may be wound up into a roll, or transported or stored in any other convenient form, for an indefinite period. As long as the film is not subjected to elevated temperature the azodicarbonamide remains undecomposed, and the film can be marketed as such or handled in the same manner as a typical conventional plastic film.

The next essential step in the method of the invention involves heating the thus previously fused, calendered, solid film or sheet briefly to a temperature in excess of 190° C. (suitably from about 190° to about 255° C.), whereby the previously incorporated azodicarbonamide is decomposed within the plastic film, thereby liberating nitrogen gas which causes the film to expand to at least several times its original thickness, and thereby producing a uniform, expanded or foamed film of good physical properties. Perhaps the most surprising result of this procedure lies in the fact that the film does not become ruptured or otherwise damaged or distorted, and the surface of the blown film is essentially continuous on both sides. It is not believed that it could have been foreseen beforehand that such an essentially solid skin would be formed on each surface of the expanded film, even though the process is carried out at atmospheric pressure without any effort to confine or contain the surfaces of the film by means of platens or molds or similar confining means. The ability of the sheet or film prepared as described to be blown freely without disruption is believed to be a consequence of the fact that the film was previously fused during the calendering operation, thereby imparting great strength to the film. It would appear that once the sheet or film has been fused at a sufficiently elevated temperature, as in the previously described calendering operation, it is possible thereafter to heat the sheet briefly to temperatures appreciably in excess of the fusion temperature without encountering a "no strength" condition. This ability of the previously fused sheet to be heated to a temperature substantially in excess of its fusion temperature for a brief period of time, without suffering complete disintegration or melting, is taken advantage of in the present process when the sheet is subsequently heated to a temperature sufficiently elevated to decompose the azodicarbonamide.

The preferred thermoplastic resins employed in the invention are the vinyl chloride resins, in which category we include homopolymers of vinyl chloride and the known copolymers of vinyl chloride, such as those obtained by copolymerizing vinyl chloride with a minor amount of one or more copolymerizable monomers, such as vinyl acetate, vinylidene chloride, diethyl maleate, etc. Other conventional thermoplastic resins that may be employed include polyethylene, and the commercial material known as "Cycolac" (believed to be a graft polymer of styrene and acrylonitrile on polybutadiene or GR–S), etc. If desired, mixtures of resins may be used, or mixtures of resins with rubbery materials (e.g., polyvinyl chloride and/or styrene-acrylonitrile resin in admixture with GR–S or nitrile rubber). In such mixtures there may be included a phenolic resin, or other modifying ingredients, including fillers, pigments or other coloring matter, stabilizers or antioxidants, flock, plasticizers or softeners, processing aids or lubricants, etc. The invention will be further described with particular emphasis on the use of vinyl resin, especially vinyl chloride resin.

The typical vinyl chloride resin compositions employed in the invention have a fusion or calendering temperature in excess of 150° C., and preferably in excess of 160° C. but not greater than 185° C. Resin compositions which fuse at such relatively highly elevated temperatures are capable of forming, by calendering at such relatively highly elevated temperatures, unusually strong films or sheets having good physical properties, and such films are well able to withstand without disintegration the subsequent blowing stage, which involves even more highly elevated temperatures. This is in contrast to resin compositions which have fusion temperatures substantially below 150° C., or which are calendered into sheets at temperatures substantially below 150° C. Films or sheets calendered at such relatively low temperatures are not in general of the same high quality and strength as those calendered at higher temperatures within the presently specified range of 150° C., and especially 160° to 185° C. Furthermore, such relatively easily fusible resin compositions do not in general produce satisfactory results in the present blowing step, which is carried out at temperatures of 190° C. to 255° C., because at such high temperatures the easily fusible resin compositions have little strength.

Although we frequently include plasticizer in our resin composition, plasticizer is not mandatory (as distinguished from the plastisol processes), and it is a unique feature of the present process that it is operative with rigid vinyl resin containing little or no plasticizer. In general, if we use any plasticizer at all we use less than would be required in the plastisol process. Thus, in the plastisol process it is usually necessary to compound the vinyl chloride resin with about 100 parts by weight of plasticizer, per 100 parts of the vinyl chloride resin, whereas in the present process we prefer to use less plasticizer, usually not more than 80 parts, and preferably not more than 60 parts. The vinyl resin or partially compounded vinyl resin is typically initially in the form of discrete pieces or particles, such as a powdered or diced material. The mixture including the vinyl resin and blowing agent is worked, usually on an open roll mill (with or without previous working in an internal mixer) in a heated, plastic condition until a relatively homogeneous and at least partially fused coherent mixture is obtained, in which the azodicarbonamide presumably exists in the form of fine, evenly distributed particles, or the azodicarbonamide may be dissolved at least partially, but in any case it is substantially uniformly distributed. The milled mixture is a solid, in which the original resin particles have generally lost their individual identity and have become fused together and in bulk it is a quite hard, and generally rigid mass at ordinary temperatures.

The next step of the process involves calendering the solid vinyl resin mixture containing the blowing agent to form a thin film or sheet. This may be accomplished, for example, on the usual three or four roll calender ordinarily used for making films from plastic stocks, and the procedure is in general similar to that conventionally used for making vinyl film. During the calendering operation, the plastic mass is subjected to a temperature sufficiently elevated to bring about substantial fusion of the resin, so that a coherent, uniform film is formed, that is self-supporting and non-tacky and has considerable strength, and the original discrete particles of vinyl resin have lost all identity, if indeed they have not already done so during the previous milling step. The calendering temperature will in general be within the range of from 150° C. to 185° C., and preferably 160° C. to 185° C., depending mainly on the particular grade of vinyl resin and the plasticizer content. Such temperatures are insufficient to cause decomposition of the azodicarbonamide, this being an essential requirement of the calendering step. The calendered vinyl film containing the undecomposed azodicarbonamide has a thickness of from 0.001 to 0.15 inch.

The calendered film cools down quickly as it comes off the calender, and it may, if desired, be rolled up and stored or shipped just like conventional calendered film. There is no tendency for the previously fused film to stick to itself or to other objects and it may be handled and processed extensively without harm, being a strong and stable material.

It is desired to emphasize that the blowing or expanding step in the present process is carried out in such a manner that the azodicarbonamide is decomposed with the liberation of gas, by application of heat, but the conditions are such that the vinyl sheet does not rupture or tear, but substantially retains the porous structure imparted by decomposition of the blowing agent. This is accomplished by subjecting the calendered sheet to a temperature in excess of the decomposition temperature of the azodicarbonamide (viz., a temperature of from 190° C. to 255° C.) and discontinuing the heating almost immediately, i.e., within a period of from 5 to 60 seconds from the time required for the sheet to attain the aforementioned decomposition temperature. The said 5 to 60 second time interval immediately follows the time when a specific temperature in the range of 190–255° C. is reached. In order for the film to attain the desired blowing temperature of 190° C. or higher, we usually expose the sheeting to a higher temperature, such as 216° C., for longer periods of time, sometimes as long as 10 minutes. By thus applying quickly the heat required to decompose the blowing agent, and almost immediately withdrawing the heat, it has surprisingly been found possible to effect the blowing or expansion without harm to the sheet, even though such decomposition temperature is in general in excess of the fusion temperature of the vinyl resin, and in excess of the temperature at which the vinyl sheet ordinarily ceases to be self-supporting if such temperature is maintained for an appreciable period of time. In a sense, the invention takes advantage of the fact that the vinyl resin apparently does not pass quickly from a solid state to a fluid state when heated above its fusion temperature, but instead seemingly requires a definite dwell at or above its fusion temperature before it will cease to support itself and collapse. This seems to be true specifically of vinyl resin that has previously been fused (as in the preceding calendering operation), which fusion results in a strong, integral mass, that is not easily made fluent by subsequent heating. The invention further takes advantage of the face that if a high enough temperature is applied, the azodicarbonamide apparently can be substantially decomposed within an interval of time less than that required to change the vinyl film from a solid to a fluid condition, even though such decomposition temperature appreciably exceeds the nominal fusion temperature of the vinyl composition. Again, the effect appears to be made possible by the previous definite fusion of the vinyl resin during the preceding high-temperature calendering operation, which fusion produces a strong coherent sheet that resists subsequent efforts to rupture it. Quick withdrawal of the heat immediately fixes the blow structure in the sheet and there is thereafter no danger of collapse or rupture.

The method lends itself readily to continuous operation, as will be apparent from inspection of the accompanying drawing. In the drawing, the vinyl chloride resin mix 10 (containing azodicarbonamide) previously prepared on a mill 11, with or without previous working in an internal mixer (not shown), is transferred to a calender 12, where it is formed at a temperature of 150° C. to 185° C. as a film 13 having a thickness of from 0.001 to 0.15 inch, all as previously related. The film may be taken off the calender, cooled and wound into a roll (not shown) for subsequent expansion (after any desired intermediate fabricating or processing steps have been performed), or the film may be lead directly into a heating oven 14 in which it is continuously expanded at a temperature of from 190° C. to 255° C. and quickly withdrawn and cooled by passing around cooling drums 15 in the form of a blown sheet 16 which can be wound up subsequently into a roll 17, or if desired cut into suitable lengths (not shown) or otherwise further shaped or processed.

The resulting thin sheet or blanket of vinyl foam is unusually strong and uniform, having substantially evenly distributed minute cells of substantially uniform size. Typically, the cells are mainly closed cells, that is they are not interconnected. There is typically an impervious skin on each side of the sheet. The foam can be substantially rigid, unlike the conventional foam derived from plastisols, which is never truly rigid.

The advantages of this process are numerous. First of all, the initial film or sheet can be made at a high production rate, in continuous length which are limited only by convenience of handling. This new process allows one to produce foams from formulation having desirable properties, in a wide latitude of stiffness ranges and it is possible to employ nonmigratory formulations (i.e., formulations substantially devoid of solvent-type or monomeric type plasticizer, which tends to migrate out of the sheet over a period of time, to the detriment of the properties of the sheet, or to the detriment of bodies in contact with the sheet, such as adhesives). By varying the resin formulation it is possible to make films or sheets having good low temperature flexibility as well as high temperature resistance, and it is also possible to make non-inflammable films. Frequently such qualities or variations in the formulation are not feasible in the plastisol process, because of the essential requirement for a large volume of solvent-type plasticizer. The present sheets or film are materially less expensive to ship and store than the conventional blown foams.

In addition, this fused film or sheet lends itself to the myriad of post-calendering operations available to vinyl film such as printing, combining with other vinyl films, metal, fabric, and wood, prior to the blowing. Thus, Fig. 2 shows a laminate of calendered vinyl film 20, prepared as described above, except that it has been calendered directly onto the surface of a textile fabric base 21. When such laminate is subjected to the described blowing operation, the vinyl film 20 as shown in Fig. 3 expands freely while remaining firmly adhered to the fabric base 21. In place of the fabric base 21, we may employ any other flexible base, such as a plastic sheet or film, leather, etc., on one or both sides of the laminate. Similarly, a vinyl resin film 25 as shown in Fig. 4 may be adhered to a rigid base, such as a metal base 26 (for example, by the method of Kiernan and Fischer, U.S. Patent 2,728,703, December 27, 1955) after which the film may be blown to the condition shown in Fig. 5, while still adhered to such base. Prior to the blowing step, the laminate may be subjected to post-forming operations, as disclosed in Patent No. 2,728,703. Other rigid bases, such as rigid plastic sheets, may be substituted for the metal base, on one or both sides of the laminate.

The present calendered film also lends itself to novel intermittent blowing to obtain ribbing or quilting effects. Thus, as shown in Fig. 6, a calendered sheet 30 prepared in accordance with the invention may be passed around a heated drum 31, the surface of which bears a desired raised design or pattern, such as parallel bars 32. The heated bars 32 thus contact the sheet 30 at predetermined localities 33, thereby heating such localities to blowing temperature and producing the effect illustrated. It will be seen that the sheet 30 thus acquires spaced raised or blown areas 34, corresponding to the localities that were contacted by the raised bars of the heated drum. Various desired designs or patterns may be created on the film in this manner.

Foams of different colors and stiffnesses may be combined by laminating a plurality of appropriately formulated films, before or after the blowing step.

*Example*

An example of a vinyl formulation that lends itself to this process is the following:

| | |
|---|---|
| Vinyl chloride resin ("Marvinyl VR-21") [1] | 100.0 |
| Plasticizer (dioctyl phthalate) | 80.0 |
| Stabilizers: | |
|     Barium-cadmium laurate [2] | 1.0 |
|     Diphenyl phosphite [3] | 1.0 |
|     Epoxidated glycidyl ether [4] | 1.0 |
|     Stearic acid | 0.5 |
| Blowing agent (Celogen AZ) [5] | 15.0 |
| | 198.5 |

[1] Polyvinyl chloride.
[2] "Ferro 1820."
[3] "Ferro 903," a chelating type of stabilizer.
[4] "Ferro 900."
[5] Azodicarbonamide.

The above ingredients were pre-mixed cold for 10 minutes by agitation in conventional internal mixing equipment. (The stabilizers mentioned are optional and can be replaced by other conventional [cf. e.g. Modern Plastics Encyclopedia, 1956, p. 354-357] stabilizers with equivalent results.) The pre-mix was then fluxed on a mill at about 160° C. until a homogeneous mass was obtained. The mix was then calendered at a temperature of 165° C. into a sheet 0.030 inch thick. This sheet was non-tacky after cooling, and was stable and could be rolled up and shipped or stored indefinitely. Upon passing through an oven wherein the sheet was exposed to a temperature of 216° C. for a period of 7 minutes, the sheet expanded to a thickness of 0.120". The resulting foam was soft and pliable, and had a continuous skin on both sides. The cell structure was uniform and unicellular. The density of the foam was approximately 20 pounds per cubic foot, and it had a 100% modulus of 100 p.s.i. The tensile strength of the foam was 150 p.s.i., and the elongation at break was 200%.

It is desired to emphasize the criticality of selecting in the present process a blowing agent that decomposes at a temperature of 190° C. or above. It is only by the selection of such a blowing agent that the desirable vinyl chloride resin compositions having a high fusion temperature can be employed successfully, and it is only by selection of such a blowing agent that the desired high calendering temperatures can be employed, without premature decomposition of the blowing agent. We have found that azodicarbonamide is an ideal blowing agent, for the foregoing reason, and also because of additional essential advantages. Azodicarbonamide does not form objectionable quantities of surface "bloom" which would interfere with post-calendering operations such as printing, heat sealing, or combining with other materials. Neither does azodicarbonamide produce objectional deep coloration which would severely limit the color shades possible in the foam. Of paramount importance also is the ability of azodicarbonamide to produce, in economical concentrations, a manifold expansion of the vinyl chloride resin film, to up to five or even more times its original thickness, the cell structure being remarkably fine and uniform, when the process is carried out under the critical conditions described.

The foregoing results are in direct contrast to those obtained if it is attempted to carry out a similar process with other blowing agents, for example, with benzilmonohydrazon (van Gaver, U.S. Patent 2,586,887, February 26, 1952). The latter blowing agent decomposes at about 150–160° C., thereby limiting one to the use of resin compounds that can be processed at temperatures substantially less than 150° C. Such compounds usually require low molecular weight resins and/or excessive quantities of plasticizer, and in general such compounds have definitely inferior heat resistance, inferior physical properties, inferior solvent resistance, and have other undesirable characteristics, in contrast to the resin compositions operable in the present process, which resin compositions in general have a fluxing temperature of from 150° to 185° C., and preferably 160° to 185° C.

Having thus described our invention, what we claim and desire to protect by Letters Patent is:

1. A method of making a laminated article having a layer of vinyl chloride resin foam attached to a sheet of base material comprising milling a solid vinyl chloride resin having a fusion temperature of 150° C. to 185° C. and a blowing agent having a decomposition temperature of at least 190° C., the resulting milled mixture being a unitary, solid, non-particulate mass which is non-flowable and self-supporting at room temperature, calendering the said mass continuously into a thin, coherent film of indefinited length having a thickness of from 0.001 to 0.15 inch, the temperature during said calendering being within the range of 150° C. to 185° C. and being sufficient to fuse the resin so that the film thus produced is strong and inherently capable of being reheated briefly in excess of fusion temperature without encountering a non-strength condition, the said film being applied to a sheet of base material, subsequently passing a running length of the resulting assembly of film and sheet of base material continuously through an oven wherein the assembly is heated to a film temperature of 190° C. to 255° C. at atmospheric pressure without confinement, said film temperature being maintained for a period of 5 to 60 seconds to decompose the blowing agent with liberation of gas and freely expand the film without disruption to form a uniform, blown sheet having at least several times the thickness of the original film, such blown sheet having a continuous surface and being attached to said base, and immediately thereafter cooling the assembly.

2. A method of making a laminated article having a layer of vinyl chloride resin attached to a sheet of base material comprising continuously forming a film of plasticized vinyl chloride resin containing a blowing agent having a decomposition temperature of at least 190° C., the said resin having a fusion temperature of 160° C. to 185° C., the said film being formed at a temperature within the range of 160° C. to 185° C. whereby the resin is thoroughly fused and the film is inherently capable of being subsequently reheated briefly in excess of fusion temperature without encountering a no-strength condition, the said film being applied to a sheet of base material, subsequently passing a running length of the resulting assembly of film and sheet of base material continuously through an oven wherein the assembly is heated to a film temperature of 190° C. to 255° C. at atmospheric pressure without confinement, said film temperature being maintained for a period of 5 to 60 seconds to decompose the blowing agent with liberation of gas and freely expand the film without disruption to form a uniform, blown sheet of plasticized vinyl chloride resin having at least several times the thickness of the original film, such blown sheet having a continuous surface and being attached to the said base, and immediately thereafter cooling the assembly.

3. A method of making a laminated article having a layer of plasticized vinyl chloride resin foam attached to a sheet of base material comprising milling solid vinyl chloride resin, plasticizer for said resin, and azodicarbonamide as a blowing agent, the said resin having a fusion temperature of 150° C. to 185° C., the resulting milled mixture being a unitary, solid, non-particulate mass which is non-flowable and self-supporting at room temperature, calendering the said mass continuously into a thin, coherent film of indefinite length having a thickness of from 0.001 to 0.15 inch, the temperature during said calendering being within the range of 150° C. to 185° C. and being sufficient to fuse the resin so that the film thus produced is strong and inherently capable of being reheated briefly in excess of fusion temperature without encountering a no-strength condition, the said film being applied to a sheet of base material, subsequently passing a running length of the resulting assembly of film and sheet of base material continuously through an oven wherein the assembly is heated to a film temperature of 190° C. to 225° C. at atmospheric pressure without confinement, said film temperature being maintained for a period of 5 to 60 seconds to decompose the azodicarbonamide with liberation of gas and freely expand the film without disruption to form a uniform, blown sheet of plasticized vinyl chloride resin having at least several times the thickness of the original film, such blown sheet having a continuous surface and being attached to said base, and immediately thereafter cooling the assembly.

4. A method of making a laminate of a plasticized vinyl chloride resin foam and a textile fabric base comprising continuously forming a film of plasticized vinyl chloride resin containing azodicarbonamide as a blowing agent on a running length of textile fabric base, the said resin having a fusion temperature within the range of 160° C. to 185° C., the said film being formed at a temperature within the range of 160° C. to 185° C. whereby the resin is thoroughly fused and the film is inherently capable of being subsequently reheated briefly in excess of fusion tempreature without encountering a no-strength condition, the said film having a thickness of from 0.001 to 0.15 inch, subsequently passing a running length of the resulting assembly of film and textile fabric base continuously through an oven wherein the assembly is heated to a film temperature of 190° C. to 255° C. at atmospheric pressure without confinement, said film temperature being maintained for a period of 5 to 60 seconds to decompose the azodicarbonamide with liberation of gas and freely expand the film without disruption to form a uniform, blown sheet of plasticized vinyl chloride resin having at least several times the thickness of the original film, such blown sheet having a continuous surface and being attached to said base, and immediately thereafter cooling the assembly.

5. A method of making a laminate of a plasticized vinyl chloride resin foam and a textile fabric base comprising milling solid vinyl chloride resin, plasticizer for said resin, and azodicarbonamide as a blowing agent, the resulting mixture being a unitary, solid, non-particulate mass which is non-flowable and self-supporting at room temperature and which has a fusion temperature of from 160° C. to 185° C., calendering the said mass continuously onto a running length of a textile fabric base in the form of a thin, coherent film of indefinite length having a thickness of from 0.001 to 0.15 inch, the temperature during said calendering being within the range of 160° C. to 185° C. and being sufficient to fuse the resin so that the film thus produced is strong and inherently capable of being reheated briefly in excess of the fusion temperature without encountering a no-strength condition, subsequently passing a running length of the resulting assembly of film and textile fabric base continuously through an oven wherein the assembly is heated to a film temperature of 190° C. to 225° C. at atmospheric pressure without confinement, said film temperature being maintained for a period of 5 to 60 seconds to decompose the azodicarbonate with liberation of gas and freely expand the film without disruption to form a uniform, blown sheet of plasticized vinyl chloride resin having at least several times the thickness of the original film, such blown sheet having a continuous surface and being attached to said textile fabric base, and immediately thereafter cooling the assembly.

References Cited in the file of this patent

UNITED STATES PATENTS

| | | |
|---|---|---|
| 2,325,903 | Blair et al. | Aug. 3, 1943 |
| 2,442,940 | Staudinger et al. | June 8, 1948 |
| 2,447,056 | Cooper | Aug. 17, 1948 |
| 2,525,965 | Smith | Oct. 17, 1950 |
| 2,576,749 | Carpentier | Nov. 27, 1951 |
| 2,740,991 | Hess et al. | Apr. 10, 1956 |

UNITED STATES PATENT OFFICE
CERTIFICATE OF CORRECTION

Patent No. 2,964,799                        December 20, 1960

Porfirio E. Roggi et al.

It is hereby certified that error appears in the above numbered patent requiring correction and that the said Letters Patent should read as corrected below.

Column 5, line 15, for "face" read -- fact --; line 27, for "blow" read -- blown; line 41, for "lead" read -- led --; column 7, line 65, for "non-strength" read -- no-strength --; column 8, line 48, and column 10, line 4, for "225° C.", each occurrence, read -- 255° C. --.

Signed and sealed this 7th day of November 1961.

(SEAL)
Attest:

ERNEST W. SWIDER                            DAVID L. LADD
Attesting Officer                                Commissioner of Patents

USCOMM-DC